(12) United States Patent
Kratzer

(10) Patent No.: US 7,414,005 B2
(45) Date of Patent: Aug. 19, 2008

(54) PREPARATION OF CATALYST COMPOSITIONS HAVING IMPROVED ACTIVITY

(75) Inventor: Roland Kratzer, Hofheim (DE)

(73) Assignee: Basell Polyolefine GmbH, Wesseling (DE)

( * ) Notice: Subject to any disclaimer, the term of this patent is extended or adjusted under 35 U.S.C. 154(b) by 229 days.

(21) Appl. No.: 10/533,323

(22) PCT Filed: Nov. 3, 2003

(86) PCT No.: PCT/EP03/12190

§ 371 (c)(1),
(2), (4) Date: May 2, 2005

(87) PCT Pub. No.: WO2004/041871

PCT Pub. Date: May 21, 2004

(65) Prior Publication Data

US 2006/0105905 A1 May 18, 2006

Related U.S. Application Data

(60) Provisional application No. 60/429,495, filed on Nov. 27, 2002.

(30) Foreign Application Priority Data

Nov. 4, 2002 (DE) .................. 102 51 491

(51) Int. Cl.
*C08F 4/602* (2006.01)
*C08F 4/622* (2006.01)
*C08F 4/6392* (2006.01)

(52) U.S. Cl. .................. 502/152; 502/103; 502/104; 502/120; 502/125; 502/128; 502/132; 526/129; 526/133; 526/160

(58) Field of Classification Search .................. 526/129, 526/133, 132, 160, 161; 502/114, 120, 132, 502/128, 152, 103, 104, 125
See application file for complete search history.

(56) References Cited

U.S. PATENT DOCUMENTS

| 6,255,418 | B1 | 7/2001 | Jolly et al. |
| 6,417,302 | B1 | 7/2002 | Bohnen |
| 6,423,660 | B1 | 7/2002 | Albizzati et al. |
| 6,482,902 | B1 | 11/2002 | Bohnen et al. |
| 6,784,261 | B1 | 8/2004 | Schopf et al. |
| 2003/0008984 | A1 | 1/2003 | Kratzer et al. |
| 2006/0166813 | A1 | 7/2006 | Kratzer |

FOREIGN PATENT DOCUMENTS

| DE | 197 10 615 | 9/1998 |
| EP | 1 153 938 | 11/2001 |
| WO | WO-98/22486 | 5/1998 |
| WO | 99/06414 | 2/1999 |
| WO | 99/40129 | 8/1999 |
| WO | WO-99/40129 | 8/1999 |
| WO | WO-00/31090 | 6/2000 |
| WO | WO-00/62928 | 10/2000 |
| WO | WO-01/09148 | 2/2001 |
| WO | WO-01/10915 | 2/2001 |
| WO | WO-01/47635 | 7/2001 |
| WO | 2004/007570 | 1/2004 |

OTHER PUBLICATIONS

Wiesenfeldt, H. et al., "*ansa*-Metallocene Derivatives, XVII. Racemic and *Meso* Diastereomers of Group IV Metallocene Derivatives with Symmetrically Substituted, Dimethylsilanediyl-Bridged Ligand Frameworks. Crystal Structure of *R, S*-Me$_2$Si(3-t-Bu-5-MeC$_5$H$_2$)$_2$ZrCl$_2$", Journal of Organometallic Chemistry, 369 (1989), pp. 359-370.
Jutzi, P. et al., "Cyclopentadienyl Compounds with Nitrogen Donors in the Side-Chain", Journal of Organometallic Chemistry 500 (1995) pp. 175-185.
Britovsek, G. J. P. et al., "Novel Olefin Polymerization Catalysts Based on Iron and Cobalt", Chem. Commun., (1998), pp. 849-850.
Small, B. L. et al., "Highly Active Iron and Cobalt Catalysts for the Polymerization of Ethylene", J. Am. Chem. Soc. (1998), 120, pp. 4049-4050.
Enders, M. et al., "8-Quinolylcyclopentadienyl, A Ligand with a Tailored Fit for Chelate Complexes", Chem. Ber. (1996), 129, pp. 459-463.

*Primary Examiner*—Caixia Lu
(74) *Attorney, Agent, or Firm*—William R. Reid

(57) ABSTRACT

The present invention relates to a process for preparing a catalyst composition for olefin polymerization, which comprises preparing a catalyst solid in a first step by bringing A) at least one support, B) at least one organic compound having at least one functional group containing active hydrogen, C) at least one organometallic compound and D) at least one organic transition metal compound into contact with one another, then bringing this catalyst solid into contact with E) at least one organoaluminum compound in a second step and then using this mixture for the polymerization without further work-up. In addition, the invention relates to catalyst system for the polymerization of olefins which comprise such catalyst compositions, to the use of the catalyst compositions or the catalyst systems for the polymerization of olefins and to a process of the polymerization of olefins.

12 Claims, No Drawings

PREPARATION OF CATALYST COMPOSITIONS HAVING IMPROVED ACTIVITY

RELATED APPLICATIONS

This application is a national stage application (under 35 U.S.C. 371) of PCT/EP2003/012190 filed Nov. 3, 2003 which claims benefit to German application 102 51 491.7 filed Nov. 4, 2002 and United States provisional application 60/429,295 filed Nov. 27, 2002.

The present invention relates to a process for preparing a catalyst composition for olefin polymerization, in which a catalyst solid is prepared in a first step by bringing at least one support, at least one organic compound having at least one functional group containing active hydrogen, at least one organometallic compound and at least one organic transition metal compound into contact with one another, this catalyst solid is then brought into contact with at least one organoaluminum compound in a second step and the mixture is subsequently used for the polymerization without further work-up. The invention further relates to catalyst systems for the polymerization of olefins comprising such catalyst compositions, their use for the polymerization of olefins and a process for the polymerization of olefins.

Organic transition metal compounds such as metallocene complexes are of great interest as catalysts for olefin polymerization because they make it possible to synthesize polyolefins which cannot be obtained using conventional Ziegler-Natta catalysts. For example, such single-site catalysts lead to polymers having a narrow molar mass distribution and uniform incorporation of comonomers. For these to be able to be used successfully in polymerization processes in the gas phase or in suspension, it is often advantageous for the metallocenes to be used in the form of a solid, i.e. for them to be applied to a solid support. Furthermore, the supported catalysts should display a high productivity and lead to polymers having a good morphology.

For organic transition metal compounds such as metallocene complexes to be active as catalysts for olefin polymerization, it is necessary for them to be reacted with further compounds serving as cocatalysts. A frequently used class of cocatalysts consists of aluminoxanes such as methyl-aluminoxane (MAO). However, these have the disadvantage that they have to be used in a large excess. Furthermore, compounds which convert the organic transition metal compounds into cationic complexes can also be used as cocatalysts, and these can be used in stoichiometric or virtually stoichiometric ratios.

WO 99/40129, WO 00/62928 and WO 01/47635 disclose, for example, catalyst systems which are obtainable by bringing a support, an organic compound having a functional group containing active hydrogen, an organometallic compound and an organic transition metal compound into contact with one another. The catalyst systems display a relatively high polymerization activity and lead to polymers having a good polymer morphology.

EP-A 1 153 938 describes catalyst systems in which a modified support is firstly prepared by reacting support particles with an organometallic compound and an organic compound having functional groups containing active hydrogen or a Lewis base. The modified support is then brought into contact with an organic transition metal compound and a further organometallic compound.

However, there is a need to achieve a further increase in the activity of the catalyst systems using the same starting materials while maintaining a good morphology of the polymers.

It is an object of the present invention to find a process for preparing a catalyst composition for olefin polymerization which makes it possible to obtain catalyst systems having an increased polymerization activity without leading to drawbacks in respect of the polymer morphology.

We have found that this object is achieved by a process for preparing a catalyst composition for olefin polymerization, which comprises preparing a catalyst solid in a first step by bringing A) at least one support,
B) at least one organic compound having at least one functional group containing active hydrogen,
C) at least one organometallic compound and
D) at least one organic transition metal compound into contact with one another, then bringing this catalyst solid into contact with E) at least one organoaluminum compound of the formula (I)

$$AlR^1R^2R^3 \qquad (I)$$

where $R^1$ is $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy and $R^2$ and $R^3$ are identical or different and are each, independently of one another, hydrogen, halogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy, in a second step and then using this mixture for the polymerization without further work-up, with it being possible to use F) at least one Lewis base in addition to the components A), B), C) and D) for preparing the catalyst solid which is brought into contact with the organoaluminum compound E).

Furthermore, we have found catalyst systems for the polymerization of olefins comprising such catalyst compositions, the use of the catalyst compositions or the catalyst systems for the polymerization of olefins and a process for the polymerization of olefins.

The catalyst compositions prepared according to the present invention are suitable for the polymerization of olefins and especially for the polymerization of α-olefins, i.e. hydrocarbons having terminal double bonds. Suitable monomers also include functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene.

Suitable olefins also include ones in which the double bond is part of a cyclic structure which may have one or more ring systems. Examples are cyclopentene, norbornene, tetracyclododecene or methylnorbornene or dienes such as 5-ethylidene-2-norbornene, norbornadiene or ethylnorbornadiene.

It is also possible to polymerize mixtures of two or more olefins.

The catalyst compositions of the present invention are particularly useful for the polymerization or copolymerization of ethylene or propylene. As comonomers in the polymerization of ethylene, preference is given to using $C_3$-$C_8$ α-olefins, in particular 1-butene, 1-pentene, 1-hexene and/or 1-octene. Preferred comonomers in the polymerization of propylene are ethylene and/or 1-butene.

The component A) used in the preparation of the catalyst solid is a support. Preference is given to using finely divided supports which may be any inert, organic or inorganic solids. In particular, the support component A) can be a porous support such as talc, a sheet silicate, an inorganic oxide or a finely divided polymer powder.

Inorganic oxides suitable as supports may be found among the oxides of elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used alone or in combination with the abovementioned oxidic supports are, for example, $ZrO_2$ or $B_2O_3$. Preferred oxides are silicon dioxide, in particular in the form of a silica gel or a pyrogenic silica, and aluminum oxide. A preferred mixed oxide is, for example, calcined hydrotalcite.

The support materials used preferably have a specific surface area in the range from 10 to 1000 m$^2$/g, preferably from 50 to 500 m$^2$/g and in particular from 200 to 400 m$^2$/g, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 μm, preferably from 5 to 350 μm and in particular from 10 to 100 μm.

The inorganic support can be subjected to a thermal treatment, e.g. to remove adsorbed water. Such a drying treatment is generally carried out at from 80 to 300° C., preferably from 100 to 200° C. Drying is preferably carried out under reduced pressure and/or in a stream of inert gas, for example nitrogen or argon. The inorganic support can also be calcined, in which case the support is treated at from 200 to 1000° C. to set the concentration of OH groups on the surface and, if desired, alter the structure of the solid. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, the treatment of silica gel with $NH_4SiF_6$ leads to fluorination of the silica gel surface, or treatment of silica gels with silanes containing nitrogen-, fluorine- or sulfur-containing groups gives correspondingly modified silica gel surfaces.

Further possible support materials are finely divided polymer powders, for example powders of polyolefins such as polyethylene or polypropylene or polystyrene powders. They are preferably freed of moisture, solvent residues or other impurities by appropriate purification or drying operations before use. It is also possible to use functionalized polymer supports, e.g. ones based on polystyrenes, via whose functional groups, for example ammonium or hydroxyl groups, at least one of the catalyst components can be fixed or whose functional groups can simultaneously act as component B) or F).

As component B) for preparing the catalyst solid, use is made of at least one organic compound which contains at least one functional group containing active hydrogen. Examples of suitable functional groups are hydroxyl groups, primary and secondary amino groups, mercapto groups, silanol groups, carboxyl groups, amido groups and imido groups, with hydroxyl groups being preferred.

Preferred compounds B) are, in particular, compounds of the formula (II)

   (II)

where

A is an atom of main group 13, 14 or 15 of the Periodic Table or a group comprising from 2 to 20 carbon atoms, preferably an atom of main group 13 of the Periodic Table, in particular boron or aluminum, or a partially halogenated or perhalogenated $C_1$-$C_{20}$-alkyl- or $C_6$-$C_{40}$-aryl group, particularly preferably an atom of main group 13 of the Periodic Table, preferably boron or aluminum and in particular boron, $R^4$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl or an $OSiR_3^5$ group, where $R^5$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl, and $R^4$ is preferably hydrogen, halogen, $C_6$-$C_{14}$-aryl, $C_6$-$C_{14}$-haloaryl, $C_1$-$C_{14}$-alkyl, $C_1$-$C_{14}$-haloalkyl, $C_7$-$C_{30}$-arylalky, $C_7$-$C_{30}$-haloarylalkyl, $C_7$-$C_{30}$-alkylaryl or $C_7$-$C_{30}$-haloalkylaryl and is particularly preferably $C_6$-$C_{10}$-aryl, $C_6$-$C_{10}$-haloaryl, $C_1$-$C_6$-alkyl, $C_1$-$C_6$-haloalkyl, $C_7$-$C_{20}$-alkylaryl or $C_7$-$C_{20}$-haloalkylaryl, y is at least 1 and is preferably from 1 to 5, in particular 1 or 2 and very particularly preferably 1 and x is an integer from 0 to 41 and is particularly preferably 2 when y=1 and particularly preferably 1 when y=2.

Examples of preferred compounds of the formula (II) are borinic acids of the formula $R^4_2B(OH)$ or boronic acids of the formula $R^4B(OH)_2$.

Particularly preferred components B) also include compounds having partially fluorinated or perfluorinated aryl groups, e.g. pentafluroophenol or nonafluorobiphenyl-1-ol or dihydroxyoctafluorobiphenyl. Compounds B) of this type can also be used in the form of an adduct with from 1 to 10 parts of water. These are then preferably compounds containing two OH groups, for example 4,4'-dihydroxyoctafluorobiphenyl-(s.H$_2$O), 1,2-dihydroxyoctafluorobiphenyl-(s.H$_2$O), 1,8-dihydroxyhexafluoronaphthalene-(s.H$_2$O) or 1,2-dihydroxyhexafluoronaphthalene-(s.H$_2$O), where s is from 1 to 10.

Furthermore, at least one organometallic compound is used as component C) in the preparation of the catalyst solid.

Suitable organometallic compounds C) are compounds of the formula (III),

   (III)

where $M^1$ is an alkali metal, an alkaline earth metal or a metal of group 13 of the Periodic Table, i.e. boron, aluminum, gallium, indium or thallium, $R^6$ is hydrogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy, $R^7$ and $R^8$ are each hydrogen, halogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy, r is an integer from 1 to 3 and s and t are integers from 0 to 2, with the sum r+s+t corresponding to the valence of $M^1$.

Among the metal compounds of the formula (III), preference is given to those in which $M^1$ is lithium, boron, magnesium or aluminum and $R^6$, $R^7$ and $R^8$ are each $C_1$-$C_{10}$-alkyl.

Particularly preferred metal compounds of the formula (III) are n-butyllithium, n-butyl-n-octyl-magnesium, n-butyl-n-heptylmagnesium, triphenylaluminum, triisoprenylaluminum, tri-n-octyl-aluminum, tri-n-hexylaluminum, tri-n-butylaluminum, triisobutylaluminum, tri-n-propylaluminum, triisopropylaluminum, triethylaluminum, trispentafluorophenylborane and trimethylaluminum and mixtures thereof.

It is also possible to use mixtures of various metal compounds of the formula (III).

In a preferred embodiment of the process of the present invention, a mixture of at least two different organometallic compounds is used as component C) for the preparation of the catalyst solid. This can be a mixture of at least one aluminum-containing organometallic compound and at least one boron-containing organometallic compound. However, the component C) can also comprise at least two different aluminum-containing organometallic compounds. Furthermore, mixtures of various aluminum-containing organometallic compounds together with boron-containing organometallic compounds can also be used as component C) in the preparation of the catalyst solid.

It is also possible to add the component C) or parts of the component C) a little at a time in a plurality of steps in the preparation of the catalyst solid, i.e. a multiple addition of individual organometallic compounds or mixtures of organometallic compounds can be carried out. For example, an organometallic compound or a mixture of organometallic compounds can firstly be brought into contact with one of the other components and this mixture can then be combined with the further components of which one or more may also have been pretreated with one or more of the organometallic compounds. However, it is also possible, for example, for a multiple addition of one or more of the organometallic compounds to the total mixture to be carried out.

Possible organic transition metal compounds D) are in principle all compounds of transition metals of groups 3 to 12 of the Periodic Table or of the lanthanides which contain organic groups and preferably form active catalysts for olefin polymerization after reaction with the components A) to C). These are usually compounds in which at least one monodentate or polydentate ligand is bound via sigma or pi bonds to the central atom. Suitable ligands include both ligands containing cyclopentadienyl radicals and ligands which are free of cyclopentadienyl radicals. Chem. Rev. 2000, Vol. 100, No. 4 describes many such compounds D) suitable for olefin polymerization. Furthermore, multinuclear cyclopentadienyl complexes are also suitable for olefin polymerization.

Suitable organic transition metal compounds D) are, in particular, those containing at least one cyclopentadienyl-type ligand; the compounds having two cyclopentadienyl-type ligands are generally referred to as metallocene complexes. Particularly useful organic transition metal compounds D) having at least one cyclopentadienyl-type ligand are those of the formula (IV)

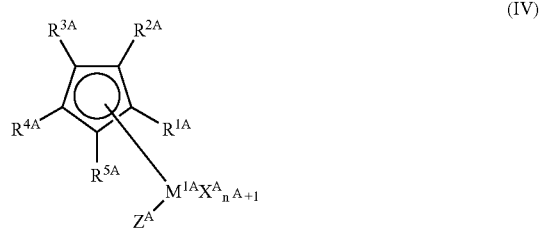

where the substituents and indices have the following meanings:

$M^{1A}$ is titanium, zirconium, hafnium, vanadium, niobium, tantalum, chromium, molybdenum or tungsten, or an element of group 3 of the Periodic Table and the lanthanides, $X^{1A}$ are identical or different and are each, independently of one another, fluorine, chlorine, bromine, iodine, hydrogen, $C_1$-$C_{10}$-alkyl, $C_2$-$C_{10}$-alkenyl, $C_6$-$C_{15}$-aryl, $C_7$-$C_{40}$-alkylaryl, $C_7$-$C_{40}$-arylalkyl, —$OR^{6A}$ or —$NR^{6A}R^{7A}$ or two radicals $X^A$ are joined to one another and form, for example, a substituted or unsubstituted diene ligand, in particular a 1,3-diene ligand, or a biaryloxy group, where $R^{6A}$ and $R^{7A}$ are each $C_1$-$C_{10}$-alkyl, $C_6$-$C_{15}$-aryl, $C_7$-$C_{40}$-arylalkyl, $C_7$-$C_{40}$-alkylaryl, fluoroalkyl or fluoroaryl each having from 1 to 16 carbon atoms in the alkyl radical and from 6 to 21 carbon atoms in the aryl radical, $n^A$ is 1, 2 or 3, with $n^A$ having a value depending on the valence of M which is such that the metallocene complex of the formula (IV) is uncharged, $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may also be substituted by halogen and/or two radicals $R^{1A}$ to $R^{5A}$, in particular adjacent radicals, may be joined so that they together with the atoms connecting them form a preferably 5-, 6- or 7-membered ring or a connecting them form a preferably 5-, 6- or 7-membered ring or a preferably 5-, 6- or 7-membered heterocycle containing at least one atom from the group consisting of N, P, O and S, where $R^{8A}$ may be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^A$ is as defined for $X^A$ or is

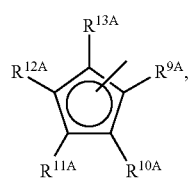

where the radicals $R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, $-NR^{14A}_2$, $-N(SiR^{14A}_3)_2$, $-OR^{14A}$, $-OSiR^{14A}_3$, $-SiR^{14A}_3$, where the radicals $R^{1A}$ to $R^{5A}$ may also be substituted by halogen and/or two radicals $R^{1A}$ to $R^{5A}$, in particular adjacent radicals, may be joined so that they together with the atoms connecting them form a preferably five-, six- or seven-membered ring or a preferably five-, six- or seven-membered heterocycle containing at least one atom from the group consisting of N, P, O and S, where $R^{14A}$ may be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, or the radicals $R^{4A}$ and $Z^A$ together form an $-R^{15A}_{v^A}$-$A^A$- group, where $R^{15A}$ is

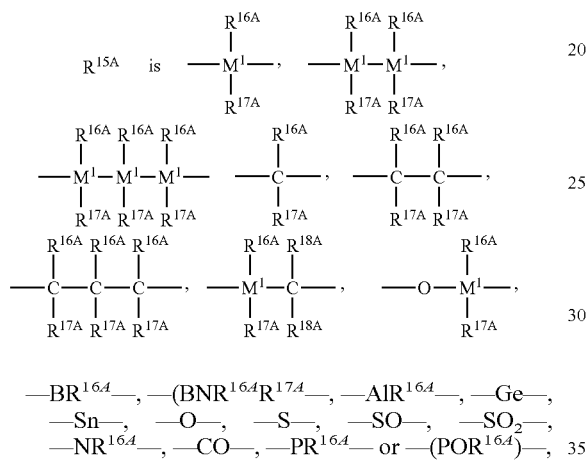

where
$R^{16A}$, $R^{17A}$ and $R^{18A}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2A}$ is silicon, germanium or tin, preferably silicon,
$A^A$ is $-O-$, $-S-$, $-NR^{19A}-$, $-PR^{19A}-$, $-O-R^{19A}$, $-NR^{19A}_2$, $-PR^{19A}_2$ or an unsubstituted, substituted or fused heterocyclic ring system, where
$R^{19A}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or $-Si(R^{20A})_3$,
$R^{20A}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl,
$v^A$ is 1 or, if $A^A$ is an unsubstituted, substituted or fused heterocyclic ring system, 1 or 0,
or the radicals $R^{4A}$ and $R^{12A}$ together form an $-R^{15A}-$ group.

The radicals $X^A$ in the formula (IV) are preferably identical and are preferably fluorine, chlorine, bromine, $C_1$-$C_7$-alkyl or arylalkyl, in particular chlorine, methyl or benzyl.

Among the organic transition metal compounds of the formula (IV), preference is given to

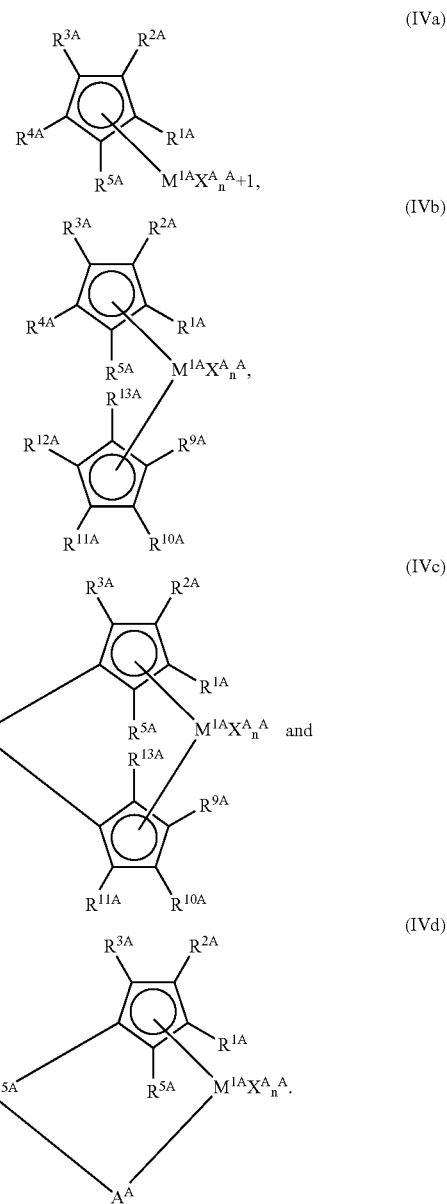

Among the compounds of the formula (IVa), particular preference is given to those in which
$M^{1A}$ is titanium or chromium,
$X^A$ is chlorine, $C_1$-$C_4$-alkyl, phenyl, alkoxy or aryloxy,
$n^A$ is 1 or 2 and
$R^{1A}$ to $R^{5A}$ are each hydrogen or $C_1$-$C_4$-alkyl or two adjacent radicals $R^{1A}$ to $R^{5A}$ together with the atoms connecting them form a substituted or unsubstituted unsaturated six-membered ring.

Among the metallocenes of the formula (IVb), preference is given to those in which
$M^{1A}$ is titanium, zirconium, hafnium or chromium,
$X^A$ are each chlorine, $C_1$-$C_4$-alkyl or benzyl, or two radicals X form a substituted or unsubstituted butadiene ligand,
$n^A$ is 1 or 2, preferably 2, or, if $M^{1A}$ is chromium, 0,
$R^{1A}$ to $R^{5A}$ are each hydrogen, $C_1$-$C_8$-alkyl, $C_6$-$C_{10}$-aryl, $-NR^{8A}_2$, $-OSiR^{8A}_3$, $-SiR^{8A}_3$ or $-Si(R^{8A})_3$ and $R^{9A}$ to $R^{13A}$ are each hydrogen, $C_1$-$C_8$-alkyl, $C_6$-$C_{10}$-aryl, —$NR^{8A}{}_2$, —$OSiR^{8A}{}_3$ —$SiR^{8A}{}_3$ or —$Si(R^{8A})_3$, or two radicals $R^{1A}$ to $R^{5A}$ and/or $R^{9A}$ to $R^{13A}$ together with the cyclopentadienyl ring form an indenyl or substituted indenyl system.

Particularly useful compounds of the formula (IVb) are those in which the cyclopentadienyl radicals are identical.

Examples of particularly suitable compounds of the formula (IVb) are bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride,
bis(1-n-butyl-3-methylcyclopentadienyl)zirconium dichloride,
bis(indenyl)zirconium dichloride,
bis(tetrahydroindenyl)zirconium dichloride and
bis(trimethylsilylcyclopentadienyl)zirconium dichloride
and the corresponding dimethylzirconium compounds.

Particularly useful metallocenes of the formula (IVc) are those in which $R^{1A}$ and $R^{9A}$ are identical or different and are each hydrogen or a $C_1$-$C_{10}$-alkyl group, $R^{5A}$ and $R^{13A}$ are identical or different and are each hydrogen or a methyl, ethyl, isopropyl or tert-butyl group, $R^{3A}$ and $R^{11A}$ are each $C_1$-$C_4$-alkyl and $R^{2A}$ and $R^{20A}$ are each hydrogen or two adjacent radicals $R^{2A}$ and $R^{3A}$ or $R^{10A}$ and $R^{11A}$ together form a saturated or unsaturated cyclic group having from 4 to 44 carbon atoms, $R^{15A}$ is -$M^{2A}R^{16A}R^{17A}$— or —$CR^{16A}R^{17A}$—$CR^{16A}R^{17A}$— or —$BR^{16A}$— or —$BNR^{16A}R^{17A}$—, $M^{1A}$ is titanium, zirconium or hafnium and $X^A$ are identical or different and are each chlorine, $C_1$-$C_4$-alkyl, benzyl, phenyl or $C_7$-$C_{15}$-alkylaryloxy.

Especially useful compounds of the formula (IVc) are those of the formula (IVc')

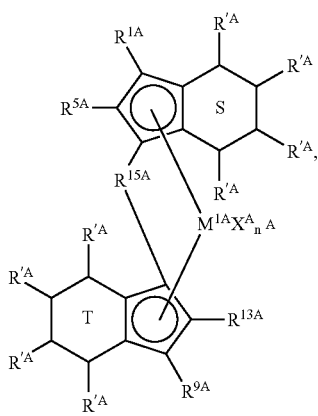

(IVc')

where
the radicals $R'^A$ are identical or different and are each hydrogen, $C_1$-$C_{10}$-alkyl or $C_3$-$C_{10}$-cycloalkyl, preferably methyl, ethyl, isopropyl or cyclohexyl, $C_6$-$C_{20}$-aryl, preferably phenyl, naphthyl or mesityl, $C_7$-$C_{40}$-arylalkyl, $C_7$-$C_{40}$-alkylaryl, preferably 4-tert-butylphenyl or 3,5-di-tert-butylphenyl, or $C_8$-$C_{40}$-arylalkenyl, $R^{5A}$ and $R^{13A}$ are identical or different and are each hydrogen, $C_1$-$C_6$-alkyl, preferably methyl, ethyl, isopropyl, n-propyl, n-butyl, n-hexyl or tert-butyl, and the rings S and T are each, independently of one another, saturated, unsaturated or partially saturated.

The indenyl or tetrahydroindenyl ligands of the metallocenes of the formula (IVc') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular in the 2,4 positions, with the following numbering applying to the site of substitution:

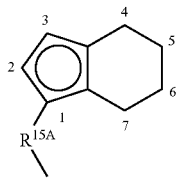

As complexes (IVc'), preference is given to using bridged bisindenyl complexes in the rac or pseudo-rac form, with the pseudo-rac form being complexes in which the two indenyl ligands are in the rac arrangement relative to one another when all other substituents of the complex are disregarded.

Examples of particularly useful metallocenes (IVc) and (IVc') include dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methyl-4,5-benzindenyl)zirconium dichloride,
dimethylsilanediylbis(2-ethyl-4,5-benzindenyl)zirconium dichloride,
methylphenylsilanediylbis(2-methyl-4,5-benzindenyl)zirconium dichloride,
methylphenylsilanediylbis(2-ethyl-4,5-benzindenyl)zirconium dichloride, diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4-(1-naphthyl)indenyl)zirconium dichloride,
dimethylsilanediylbis(2-ethyl-4-(1-naphthyl)indenyl)zirconium dichloride,
dimethylsilanediylbis(2-propyl-4-(1-naphthyl)indenyl)zirconium dichloride,
dimethylsilanediylbis(2-i-butyl-4-(1-naphthyl)indenyl)zirconium dichloride,
dimethylsilanediylbis(2-propyl-4-(9-phenanthryl)indenyl)zirconium dichloride,
dimethylsilanediylbis(2-methyl-4-isopropylindenyl)zirconium dichloride,
dimethylsilanediylbis(2,7-dimethyl-4-isopropylindenyl)zirconium dichloride,
dimethylsilanediylbis(2-methyl-4,6-diisopropylindenyl)zirconium dichloride,
dimethylsilanediylbis(2-methyl-4-[p-trifluoromethylphenyl]indenyl)zirconium dichloride,
dimethylsilanediylbis(2-methyl-4-[3',5'-dimethylphenyl]indenyl)zirconium dichloride,
dimethylsilanediylbis(2-methyl-4-[4'-tert-butylphenyl]indenyl)zirconium dichloride,
diethylsilanediylbis(2-methyl-4-[4'-tert-butylphenyl]indenyl)zirconium dichloride,
dimethylsilanediylbis(2-ethyl-4-[4'-tert-butylphenyl]indenyl)zirconium dichloride,
dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride,
dimethylsilanediylbis(2-hexyl-4-[4'-tert-butylphenyl]indenyl)zirconium dichloride,
dimethylsilanediyl(2-isopropyl-4-phenylindenyl)-(2-methyl-4-phenylindenyl)zirconium dichloride,
dimethylsilanediyl(2-isopropyl-4-(1-naphthyl)indenyl)-(2-methyl-4-(1-naphthyl)indenyl)zirconium dichloride,
dimethylsilanediyl(2-isopropyl-4-[4'-tert-butylphenyl]indenyl)-(2-methyl-4-[4'-tert-butylphenyl]-indenyl)zirconium dichloride,
dimethylsilanediyl(2-isopropyl-4-[4'-tert-butylphenyl]indenyl)-(2-ethyl-4-[4'-tert-butylphenyl]-indenyl)zirconium dichloride,
dimethylsilanediyl(2-isopropyl-4-[4'-tert-butylphenyl]indenyl)-(2-methyl-4-[3',5'-bis-tert-butylphenyl]indenyl)zirconium dichloride,
dimethylsilanediyl(2-isopropyl-4-[4'-tert-butylphenyl]indenyl)-(2-methyl-4-[1'-naphthyl]indenyl)-zirconium dichloride and
ethylene(2-isopropyl-4-[4'-tert-butylphenyl]indenyl)-(2-methyl-4-[4'-tert-butylphenyl]indenyl)-zirconium dichloride and also the corresponding dimethylzirconium, monochloromono(alkylaryloxy)zirconium and di(alkylaryloxy)zirconium compounds.

Particularly useful compounds of the formula (IVd) are those in which $M^{1A}$ is titanium or zirconium, in particular titanium, and
$X^A$ are each chlorine, $C_1$-$C_4$-alkyl or phenyl or two radicals $X$ are a substituted or unsubstituted butadiene ligand,
$R^{15A}$ is —$SiR^{16A}R^{17A}$— or —$CR^{16A}R^{17A}$—$CR^{16A}R^{17A}$—,
$A^A$ is —O—, —S— or —$NR^{19A}$—,
$R^{1A}$ to $R^{3A}$ and $R^{5A}$ are each hydrogen, $C_1$-$C_{10}$-alkyl, preferably methyl, $C_3$-$C_{10}$-cycloalkyl, $C_6$-$C_{15}$-aryl or —Si$(R^{8A})_3$, or two adjacent radicals form a cyclic group having from 4 to 12 carbon atoms, with particular preference being given to all $R^{1A}$ to $R^{3A}$ and $R^{5A}$ being methyl.

Another group of particularly useful compounds of the formula (IVd) comprises those in which
$M^{1A}$ is titanium or chromium, preferably in the oxidation state III and
$X^A$ are each chlorine, $C_1$-$C_4$-alkyl or phenyl or two radicals $X^A$ form a substituted or unsubstituted butadiene ligand,
$R^{15A}$ is —$SiR^{16A}R^{17A}$— or —$CR^{16A}R^{17A}$—$CR^{16A}R^{17A}$—,
$A^A$ is —O—$R^{19A}$, —$NR^{19A}_2$, —$PR^{19A}_2$,
$R^{1A}$ to $R^{3A}$ and $R^{5A}$ are each hydrogen, $C_1$-$C_{10}$-alkyl, $C_3$-$C_{10}$-cycloalkyl, $C_6$-$C_{15}$-aryl or —Si$(R^{8A})_3$, or two adjacent radicals form a cyclic group having from 4 to 12 carbon atoms.

Such complexes can be synthesized by methods known per se, preferably by reaction of the appropriately substituted, cyclic hydrocarbon anions with halides of titanium, zirconium, hafnium, vanadium, niobium, tantalum or chromium.

Examples of appropriate preparative methods are described, inter alia, in Journal of Organometallic Chemistry, 369 (1989), 359-370.

Further suitable organic transition metal compounds D) are metallocenes having at least one ligand which is formed from a cyclopentadienyl or heterocyclopentadienyl and a fused-on heterocycle in which at least one carbon atom is replaced by a heteroatom, preferably a heteroatom from group 15 or 16 of the Periodic Table and in particular nitrogen or sulfur. Such compounds are described, for example, in WO 98/22486. These are, in particular,
dimethylsilanediyl(2-methyl-4-phenylindenyl)(2,5-dimethyl-N-phenyl-4-azapentalene)zirconium dichloride,
dimethylsilanediylbis(2-methyl-4-phenyl-4-hydroazulenyl) zirconium dichloride and
dimethylsilanediylbis(2-ethyl-4-phenyl-4-hydroazulenyl) zirconium dichloride.

Further organic transition metal compounds D) which are suitable for the purposes of the invention are transition metal complexes with at least one ligand of the formulae (Va) to (Ve),

(Va)

(Vc)

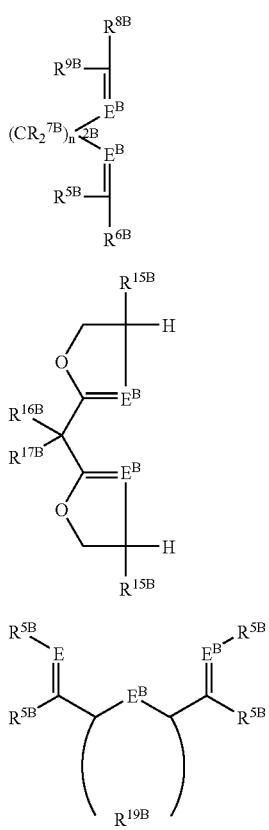

where the transition metal is selected from among the elements Ti, Zr, Hf, Sc, V, Nb, Ta, Cr, Mo, W, Fe, Co, Ni, Pd, Pt and the elements of the rare earth metals. Preference is given to compounds having nickel, iron, cobalt or palladium as central metal.

$E^B$ is an element of group 15 of the Periodic Table of the Elements, preferably N or P, with particular preference being given to N. The two or three atoms $E^B$ in a molecule can be identical or different.

The radicals $R^{1B}$ to $R^{19B}$, which may be identical or different within a ligand system of the formulae (Va) to (Ve), are as follows:

$R^{1B}$ and $R^{4B}$ are each, independently of one another, a hydrocarbon radical or a substituted hydrocarbon radical, preferably a hydrocarbon radical in which the carbon atom adjacent to the element $E^B$ is bound to at least two carbon atoms, $R^{2B}$ and $R^{3B}$ are each, independently of one another, hydrogen, a hydrocarbon radical or a substituted hydrocarbon radical, where $R^{2B}$ and $R^{3B}$ may also together form a ring system in which one or more heteroatoms may be present, $R^{6B}$ and $R^{8B}$ are each, independently of one another, a hydrocarbon radical or a substituted hydrocarbon radical, $R^{5B}$ and $R^{9B}$ are each, independently of one another, hydrogen, a hydrocarbon radical or a substituted hydrocarbon radical, where $R^{6B}$ and $R^{5B}$ or $R^{8B}$ and $R^{9B}$ may together also form a ring system, $R^{7B}$ are each, independently of one another, hydrogen, a hydrocarbon radical or a substituted hydrocarbon radical, where two $R^{7A}$ may together also form a ring system, $R^{10B}$ and $R^{14B}$ are each, independently of one another, a hydrocarbon radical or a substituted hydrocarbon radical, $R^{11B}$, $R^{12B}$, $R^{12B'}$ and $R^{13B}$ are each, independently of one another, hydrogen, a hydrocarbon radical or a substituted hydrocarbon radical, where two or more geminal or vicinal radicals $R^{11B}$, $R^{12B}$, $R^{12B'}$ and $R^{13B}$ may together also form a ring system, $R^{15B}$ and $R^{18B}$ are each, independently of one another, hydrogen, a hydrocarbon radical or a substituted hydrocarbon radical, $R^{16B}$ and $R^{17B}$ are each, independently of one another, hydrogen, a hydrocarbon radical or a substituted hydrocarbon radical, $R^{19B}$ is an organic radical which forms a 5- to 7-membered substituted or unsubstituted, in particular unsaturated or aromatic, heterocyclic ring system, in particular together with $E^B$ forms a pyridine system, $n^{1B}$ is 0 or 1, with compounds of the formula (Vc) being negatively charged when $n^{1B}$ is 0, and $n^{2B}$ is an integer from 1 to 4, preferably 2 or 3.

Particularly useful transition metal complexes with ligands of the formulae (Va) to (Vd) are, for example, complexes of the transition metals Fe, Co, Ni, Pd and Pt with ligands of the formula (Va). Particular preference is given to diimine complexes of Ni or Pd, e.g.:

di(2,6-di-i-propylphenyl)-2,3-dimethyldiazabutadienepalladium dichloride,
di(di-i-propylphenyl)-2,3-dimethyldiazabutadienenickel dichloride,
di(2,6-di-i-propylphenyl)-2,3-dimethyldiazabutadienedimethylpalladium,
di(2,6-di-i-propylphenyl)-2,3-dimethyldiazabutadienedimethylnickel,
di(2,6-dimethylphenyl)-2,3-dimethyldiazabutadienepalladium dichloride,
di(2,6-dimethylphenyl)-2,3-dimethyldiazabutadienenickel dichloride,
di(2,6-dimethylphenyl)-2,3-dimethyldiazabutadienedimethylpalladium,
di(2,6-dimethylphenyl)-2,3-dimethyldiazabutadienedimethylnickel,
di(2-methylphenyl)-2,3-dimethyldiazabutadienepalladium dichloride,
di(2-methylphenyl)-2,3-dimethyldiazabutadienenickel dichloride,
di(2-methylphenyl)-2,3-dimethyldiazabutadienedimethylpalladium,
di(2-methylphenyl)-2,3-dimethyldiazabutadienedimethylnickel,
diphenyl-2,3-dimethyldiazabutadienepalladium dichloride,
diphenyl-2,3-dimethyldiazabutadienenickel dichloride,
diphenyl-2,3-dimethyldiazabutadienedimethylpalladium,
diphenyl-2,3-dimethyldiazabutadienedimethylnickel,
di(2,6-dimethylphenyl)azanaphthenepalladium dichloride,
di(2,6-dimethylphenyl)azanaphthenenickel dichloride,
di(2,6-dimethylphenyl)azanaphthenedimethylpalladium,
di(2,6-dimethylphenyl)azanaphthenedimethylnickel,
1,1'-bipyridylpalladium dichloride,
1,1'-bipyridylnickel dichloride,
1,1'-bipyridyl(dimethyl)palladium or
1,1'-bipyridyl(dimethyl)nickel.

Particularly useful compounds (Ve) are those described in J. Am. Chem. Soc. 120, p. 4049 ff. (1998), J. Chem. Soc., Chem. Commun. 1998, 849. As preferred complexes with ligands (Ve), it is possible to use 2,6-bis(imino)pyridyl complexes of the transition metals Fe, Co, Ni, Pd or Pt, in particular Fe.

Further compounds which can be used as organic transition metal compound D) are iminophenoxide complexes whose ligands can be prepared, for example, from substituted or unsubstituted salicylaldehydes and primary amines, in particular substituted or unsubstituted arylamines. Transition metal complexes with pi ligands which contain one or more heteroatoms in the pi system, for example the boratabenzene ligand, the pyrrolyl anion or the phospholyl anion, can also be used as organic transition metal compounds D).

Transition metal compounds D) which are suitable for the purposes of the present invention also include substituted monocyclopentadienyl, monoindenyl, monofluorenyl or heterocyclopentadienyl complexes of chromium, molybdenum or tungsten in which at least one of the substituents on the cyclopentadienyl ring bears a rigid donor function which is not bound exclusively via $sp^3$-hybridized carbon or silicon atoms. The most direct linkage to the donor function here contains at least one sp- or $sp^2$-hybridized carbon atom, preferably from one to three $sp^2$-hybridized carbon atoms. The direct linkage preferably contains an unsaturated double bond, an aromatic or together with the donor forms a partially unsaturated or aromatic heterocyclic system.

In these transition metal compounds, the cyclopentadienyl ring can also be a heterocyclopentadienyl ligand, i.e. at least one carbon atom can be replaced by a heteroatom from group 15 or 16. In this case, preference is given to one $C_5$-ring carbon atom being replaced by phosphorus. In particular, the cyclopentadienyl ring is substituted by further alkyl groups which can also form a five- or six-membered ring, e.g. tetrahydroindenyl, indenyl, benzindenyl or fluorenyl.

Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide or unsubstituted, substituted or fused, partially unsaturated heterocyclic or heteroaromatic ring systems.

Preference is here given to using substituted monocyclopentadienyl, monoindenyl, monofluorenyl or heterocyclopentadienyl complexes of the formula (VI)

$$\left[ Z^C - M^C - X^C_{n^C} \right]_{m^C}, \quad (VI)$$

where
M$^C$ is chromium, molybdenum or tungsten and
Z$^C$ has the formula (VIa)

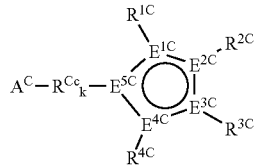

(VIa)

where the variables have the following meanings:
E$^{1C}$-E$^{5C}$ are each carbon or not more than one atom E$^{1C}$ to E$^{5C}$ is phosphorus or nitrogen,
A$^C$ is —NR$^{5C}$R$^{6C}$, —PR$^{5C}$R$^{6C}$, —OR$^{5C}$, —SR$^{5C}$ or an unsubstituted, substituted or fused, partially unsaturated heterocyclic or heteroaromatic ring system, R$^C$ is one of the following groups:

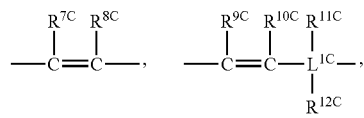

and, if A$^C$ is an unsubstituted, substituted or fused, partially unsaturated heterocyclic or aromatic ring system, may also be

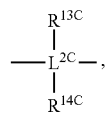

where
L$^{1C}$, L$^{2C}$ is silicon or carbon,
k$^C$ is 1 or when A$^{1C}$ is an unsubstituted, substituted or fused, partially unsaturated heterocyclic or heteroaromatic ring system may also be 0,
X$^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, —NR$^{15C}$R$^{16C}$, —OR$^{15C}$, —SR$^{15C}$, —SO$_3$R$^{15C}$, —OC(O)R$^{15C}$, —CN, —SCN, β-diketonate, —CO, BF$_4^-$, PF$_6^-$ or a bulky non-coordinating anion,
R$^{1C}$—R$^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl part and 6-20 carbon atoms in the aryl part, SiR$^{17C}_3$, where the organic radicals R$^{19}$—R$^{16B}$ may also be substituted by halogens and two geminal or vicinal radicals R$^{1C}$—R$^{16C}$ may also be joined to form a five- or six-membered ring,
R$^{17C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, and two geminal radicals R$^{17C}$ may also be joined to form a five- or six-membered ring,
n$^C$ is 1,2 or 3 and
m$^C$ is 1,2 or 3.

The transition metal M$^C$ is particularly preferably chromium.

Examples of organic transition metal compounds of the formula (VI) are
1-(8-quinolyl)-2-methyl-4-methylcyclopentadienylchromium(III) dichloride,
1-(8-quinolyl)-3-isopropyl-5-methylcyclopentadienylchromium(III) dichloride,
1-(8-quinolyl)-3-tert-butyl-5-methylcyclopentadienylchromium(III) dichloride,
1-(8-quinolyl)-2,3,4,5-tetramethylcyclopentadienyl-chromium(III) dichloride,
1-(8-quinolyl)tetrahydroindenylchromium(III) dichloride,
1-(8-quinolyl)indenylchromium(III) dichloride,
1-(8-quinolyl)-2-methylindenylchromium(III) dichloride,
1-(8-quinolyl)-2-isopropylindenylchromium(III) dichloride,
1-(8-quinolyl)-2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride, 1-(8-(2-methylquinolyl))-2-methyl4-methylcyclopentadienylchromium(III) dichloride,
1-(8-(2-methylquinolyl))-2,3,4,5-tetramethylcyclopentadienylchromium(III) dichloride,
1-(8-(2-methylquinolyl))tetrahydroindenylchromium(III) dichloride,
1-(8-(2-methylquinolyl))indenylchromium(III) dichloride,
1-(8-(2-methylquinolyl))-2-methylindenylchromium(III) dichloride,
1-(8-(2-methylquinolyl))-2-isopropylindenylchromium(III) dichloride,
1-(8-(2-methylquinolyl))-2-ethylindenylchromium(III) dichloride,
1-(8-(2-methylquinolyl))-2-tert-butylindenylchromium(III) dichloride,
1-(8-(2-methylquinolyl))benzindenylchromium(III) dichloride or
1-(8-(2-methylquinolyl))-2-methylbenzindenylchromium (III) dichloride.

The preparation of functional cyclopentadienyl ligands has been known for a long time. Various synthetic routes to these complexing ligands are described, for example, by M. Enders et al. in Chem. Ber. (1996), 129, 459-463, or P. Jutzi and U. Siemeling in J. Orgmet. Chem. (1995), 500, 175-185.

The metal complexes, particularly chromium complexes, can be obtained in a simple manner by reacting the appropriate metal salts, e.g. metal chlorides, with the ligand anion (e.g. by methods analogous to the examples in DE-A 197 10 615).

Further transition metal compounds D) which are suitable for the purposes of the present invention are imidochromium compounds of the formula (VII):

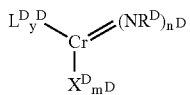
(VII)

where the variables have the following meanings:
$R^D$ is $R^{1D}C=NR^{2D}$, $R^{1D}C=O$, $R^{1D}C=O(OR^{2D})$, $R^{1D}C=S$, $(R^{1D})_2P=O$, $(OR^{1D})_2P=O$, $SO_2R^{1D}$, $R^{1D}R^{2D}C=N$, $NR^{1D}R^{2D}$ or $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ and $R^{2D}$ may also bear inert substituents, $X^D$ are each, independently of one another, fluorine, chlorine, bromine, iodine, $-NR^{3D}R^{4D}$, $-NP(R^{3D})_3$, $-OR^{3D}$, $-OSi(R^{3D})_3$, $-SO_3R^{3D}$, $-OC(O)R^{3D}$, β-diketonate, $BF_4^-$, $PF_6^-$ or a bulky weakly coordinating or noncoordinating anion, $R^{1D}$-$R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ to $R^{4D}$ may also bear inert substituents, $n^D$ is 1 or 2,
$m^D$ is 1, 2 or 3 and is such that, depending on the valence of Cr, the metallocene complex of the formula (VII) is uncharged,
$L^D$ is an uncharged donor and
$y^D$ is from 0 to 3.

Such compounds and their preparation are described, for example, in WO 01/09148.

Further suitable organic transition metal compounds D) are transition metal complexes with a tridentate macrocyclic ligand, e.g.
[1,3,5-tri(methyl)-1,3,5-triazacyclohexane]chromium trichloride,
[1,3,5-tri(ethyl)-1,3,5-triazacyclohexane]chromium trichloride,
[1,3,5-tri(octyl)-1,3,5-triazacyclohexane]chromium trichloride,
[1,3,5-tri(dodecyl)-1,3,5-triazacyclohexane]chromium trichloride and
[1,3,5-tri(benzyl)-1,3,5-triazacyclohexane]chromium trichloride.

It is also possible to use mixtures of various organic transition metal compounds as component D).

In a preferred embodiment, a Lewis base is used as further component F) for preparing the catalyst solid which is brought into contact with the organoaluminum compound E). Suitable Lewis bases F) have the formula (VIII), $$M^2R^9R^{10}R^{11} \qquad (VIII)$$

where
$R^9$, $R^{10}$ and $R^{11}$ are identical or different and are each a hydrogen atom, a $C_1$-$C_{20}$-alkyl group, a $C_1$-$C_{20}$-haloalkyl group, a $C_6$-$C_{40}$-aryl group, a $C_6$-$C_{40}$-haloaryl group, a $C_7$-$C_{40}$-alkylaryl group or a $C_7$-$C_{40}$-arylalkyl group, and two radicals or all three radicals $R^9$, $R^{10}$ and $R^{11}$ may be joined to one another via $C_2$-$C_{20}$-carbon units, and
$M^2$ is an element of group 15 of the Periodic Table of the Elements.

$R^9$, $R^{10}$ and $R^{11}$ are preferably each $C_1$-$C_{20}$-alkyl, $C_6$-$C_{40}$-aryl or $C_7$-$C_{40}$-alkylaryl. Particular preference is given to at least one radical $R^9$, $R^{10}$ or $R^{11}$ being a $C_7$-$C_{40}$-arylalkyl group, for example benzyl.

$M^2$ is preferably nitrogen or phosphorus and in particular nitrogen.

Examples of Lewis bases used as component F) are methylamine, aniline, dimethylamine, diethylamine, N-methylaniline, diphenylamine, trimethylamine, triethylamine, tripropylamine, tributylamine, N,N-dimethylaniline, N,N-diethylaniline and N,N-dimethylcyclohexylamine. Particularly preferred Lewis bases are, for example, benzylamine, N-benzyldimethylamine, N-benzyldiethylamine, N-benzylbutylamine, N-benzyl-tert-butylamine, N'-benzyl-N,N-dimethylethylenediamine, N-benzylethylenediamine, N-benzylisopropylamine, N-benzylmethylamine, N-benzylethylamine, N-benzyl-1-phenylethylamine, N-benzyl-2-phenylethylamine and N-benzylpiperazine.

According to the present invention, the process for preparing the catalyst solids which are brought into contact with the organoaluminum compound E) is carried out by bringing the components A) to D) and, if used, F) into contact with one another in any order. All components can be added individually in succession, but it is also possible for individual components firstly to be mixed with one another and these mixtures then to be brought into contact with other mixtures and/or individual components.

A preferred way of bringing the components into contact with one another comprises firstly bringing the organic compound having at least one functional group B) containing active hydrogen into contact with the organometallic compound C), with part of the organometallic compound C) or, when a mixture of various organometallic compounds is uesd, with at least one of the constituents of the component C).

The components are usually combined in the presence of an organic solvent in which the support A), the reaction products of the support or the catalyst solid being formed is suspended. Suitable solvents are aromatic or aliphatic solvents, for example hexane, heptane, toluene or xylene, or halogenated hydrocarbons such as methylene chloride or halogenated aromatic hydrocarbons such as o-dichlorobenzene.

The components are generally combined at temperatures in the range from −20° C. to 150° C., preferably in the range from 0° C. to 100° C. When not all of the components are combined simultaneously, the temperature in the individual steps of combining the components may be the same in each case. However, the temperatures of the individual steps can also be different.

The time for which the components which have been brought into contact with one another are allowed to react is generally from 1 minute to 48 hours. Preference is given to reaction times of from 10 minutes to 6 hours. When the components are combined in a stepwise fashion, the reaction times for the individual steps are usually from 1 minute to 6 hours, preferably from 10 minutes to 2 hours.

The molar ratio of any Lewis base F) used to compound B) is preferably from 0.05:1 to 2:1, in particular from 0.1:1 to 1:1.

The molar ratio of organic transition metal compound D) to functional groups containing active hydrogen of the compounds B) is preferably from 1:0.1 to 1:1000, in particular from 1:1 to 1:100.

The reaction product obtained after the components A) to D) and, if used, F) have been combined can be a solid, a moist solid or a suspension. This reaction product can be used as such, if appropriate together with further constituents of the catalyst system, in the second step for preparing the catalyst composition, i.e. bringing the reaction product into contact with the organoaluminum compound E). The reaction product is usually worked up beforehand, preferably by drying the solid. The solid can be separated off from the liquid phase beforehand, for example, by filtration and/or washing. However, it is also possible for the solvent to be taken off purely by evaporation. Drying is generally carried out at temperatures above room temperature. Preference is given to applying a vacuum during drying. The dried catalyst solid can be used as such or in resuspended form in the second step for preparing the catalyst composition.

In the second step for preparing the catalyst composition, the catalyst solid obtained by bringing the components A) to D) and, if used, F) into contact with one another is brought into contact with at least one organoaluminum compound E) of the formula (I).

In preferred organoaluminum commpounds E) of the formula (I), $R^1$ is $C_1$-$C_{10}$-alkyl, in particular $C_3$-$C_{10}$-alkyl. Furthermore, preference is given to organoaluminum compounds E) of the formula (I) in which $R^2$ and $R^3$ are each hydrogen, halogen or $C_1$-$C_{10}$-alkyl and in particular hydrogen or $C_3$-$C_{10}$-alkyl. Particular preference is given to organoaluminum compounds E) of the formula (I) in which $R^1$, $R^2$ and $R^3$ are identical and are each $C_3$-$C_{10}$-alkyl.

It is also possible to use mixtures of various organoaluminum compounds E) of the formula (I).

Particularly preferred organoaluminum compounds E) of the formula (I) are triisoprenylaluminum, tri-n-octylaluminum, tri-n-hexylaluminum, tri-n-butylaluminum, triisobutylaluminum, tri-n-propylaluminum, triisopropylaluminum and mixtures thereof.

The time for which the catalyst solid obtained by bringing the components A) to D) and, if used, F) into contact with one another and the organoaluminum compound E) are allowed to react with one another is generally from 0.5 minutes to 10 hours. Preference is given to reaction times of from 1 minute to 2 hours. The catalyst solid and the organoaluminum compound E) are generally brought into contact with one another at temperatures in the range from −10° C., to 80° C., preferably in the range from 15° C. to 75° C.

Furthermore, it is possible firstly to prepolymerize the catalyst solid with α-olefins, preferably linear $C_2$-$C_{10}$-1-alkenes and in particular ethylene or propylene, before or after it is brought into contact with the organoaluminum compound E) and then to use the resulting prepolymerized catalyst solid in the actual polymerization. The mass ratio of catalyst solid used in the prepolymerization to the monomer polymerized onto it is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the catalyst composition. The molar ratio of additives to organic transition metal compound D) is usually from 1:1000 to 1000:1, preferably from 1:5 to 20:1.

The catalyst compositions prepared according to the present invention can be used as such or together with further components as catalyst systems for the polymerization of olefins. If the catalyst systems comprise further components in addition to the catalyst compositions prepared according to the present invention, they preferably further comprise at least one scavenger as component G). For the purposes of the present invention, the term scavenger refers to an organometallic compound which is added to the monomers used in the polymerization before they are brought into contact with the catalyst composition prepared from the components A) to E) and, if used, F). Suitable organometallic compounds G) are, in particular, organometallic compounds of the formula (III), i.e. the organometallic compounds C) used for preparing the catalyst solid can also serve as scavengers G), with preferred organometallic compounds C) also being preferred scavengers G).

The polymerization can be carried out in a known manner in bulk, in suspension, in the gas phase or in a supercritical medium in the customary reactors used for the polymerization of olefins. It can be carried out batchwise or preferably continuously in one or more stages. Solution processes, suspension processes, stirred gas-phase processes or gas-phase fluidized-bed processes are all possible. As solvent or suspension medium, it is possible to use inert hydrocarbons, for example isobutane, or else the monomers themselves.

The polymerizations can be carried out at from −60 to 300° C. and pressures in the range from 0.5 to 3000 bar. Preference is given to temperatures in the range from 50 to 200° C., in particular from 60 to 100° C., and pressures in the range from 5 to 100 bar, in particular from 15 to 70 bar. The mean residence times are usually from 0.5 to 5 hours, preferably from 0.5 to 3 hours. Molar mass regulators, for example hydrogen, or customary additives such as antistatics can also be used in the polymerization.

The process of the present invention for preparing catalyst compositions for olefin polymerization makes it possible to obtain catalyst systems having a high activity, without the polymer morphology being adversely affected.

EXAMPLES

Example 1 a) Preparation of the Catalyst Solid 1 ml of a 20% strength by weight solution of trimethylaluminum in a high-boiling dearomatized hydrocarbon mixture was reacted at room temperature with 1.5 g of bis(pentafluorophenyl)borinic acid in 13 ml of toluene. After stirring for one hour, the solution was added to a suspension of 0.3 ml of dimethylbenzylamine and 1.5 g of silica gel (XPO 2107 from Grace) in 30 ml of toluene. After stirring for one hour, the supernatant solution was separated off by filtration, the solid was washed twice with 20 ml of toluene and then dried at 50° C. under reduced pressure. After the solid had been resuspended in 10 ml of toluene, a solution of 50 mg of dimethylsilanediylbis(2-methyl-4-(4'-tert-butylphenyl)indenyl)zirconium dichloride, 0.25 ml of a 20% strength by weight solution of triethylaluminum in a high-boiling dearomatized hydrocarbon mixture and 0.44 ml of a 20% strength by weight solution of triisobutylaluminum in a high-boiling dearomatized hydrocarbon mixture were added. After stirring for one hour at room temperature, the solid was dried at 50° C. under reduced pressure.

b) Activation 55 mg of the catalyst solid prepared in Example 1a) were admixed with 10 ml of heptane and 8 ml of a 20% strength by weight solution of triisobutylaluminum in a high-boiling dearomatized hydrocarbon mixture and the resulting suspension was stirred for 10 minutes at 20° C.

c) Polymerization

A dry 5 l reactor was flushed firstly with nitrogen and subsequently with propylene and then charged with 3 l of liquid propylene and 1.5 standard liters of hydrogen. The suspension of the catalyst composition prepared in Example 1 b) was subsequently introduced without further work-up into the reactor via a lock and was rinsed in with 10 ml of heptane. The reaction mixture was heated to the polymerization temperature of 65° C. and polymerized for 1 hour. This gave 750 g of pulverulent polypropylene, corresponding to a productivity of 13.6 kg of PP/g of catalyst solid.

Comparative Example

A dry 5 l reactor was flushed firstly with nitrogen and subsequently with propylene and then charged with 3 l of liquid propylene and 1.5 standard liters of hydrogen. 8 ml of a 20% strength by weight solution of triisobutylaluminum in a high-boiling dearomatized hydrocarbon mixture were added and the mixture was stirred for 15 minutes. A suspension of 55 mg of the catalyst solid prepared in Example 1a) in 10 ml of heptane was subsequently introduced into the reactor via a lock and was rinsed in with 10 ml of heptane. The reaction mixture was heated to the polymerization temperature of 65° C. and polymerized for 1 hour. This gave 374 g of pulverulent polypropylene, corresponding to a productivity of 6.8 kg of PP/g of catalyst solid.

Example 2

Example 1 was repeated, except that 42 mg of dimethylsilanediylbis(2-methyl4-phenylindenyl)zirconium dichloride were used as metallocene and 0.32 ml of a 20% strength by weight solution of trimethylaluminum in a high-boiling dearomatized hydrocarbon mixture was used in place of triethylaluminum and triisobutylaluminum in the preparation of the catalyst solid.

This gave 870 g of pulverulent polypropylene, corresponding to a productivity of 14.1 kg of PP/g of catalyst solid.

Example 3

Example 2 was repeated, except that 12 ml of the 20% strength by weight solution of triisobutylaluminum in a high-boiling dearomatized hydrocarbon mixture were used in the activation.

This resulted in a productivity of 15.8 kg of PP/g of catalyst solid.

Example 4

Example 2 was repeated, except that the polymerization was carried out without hydrogen. This resulted in a productivity of 8.6 kg of PP/g of catalyst solid.

Example 5

Example 2 was repeated, except that 12.9 ml of a 20% strength by weight solution of tri-n-octylaluminum in hexane were used in the activation.

This resulted in a productivity of 7.23 kg of PP/g of catalyst solid.

Example 6

Example 2 was repeated, except that only 6 ml of the 20% strength by weight solution of triisobutylaluminum in a high-boiling dearomatized hydrocarbon mixture were used in the activation and the remaining 2 ml were used as scavenger in the polymerization, with the 2 ml of the triisobutylaluminum solution being introduced into the reactor after it had been charged with liquid propylene and hydrogen and the mixture was stirred for 15 minutes before addition of the catalyst composition.

This resulted in a productivity of 15.5 kg of PP/g of catalyst solid.

I claim:

1. A process for preparing a catalyst composition for olefin polymerization, which comprises preparing a catalyst solid in a first step by bringing
A) at least one support,
B) at least one organic compound of formula (II):

where
A is an atom of main group 13 of the Periodic Table or a partially halogenated or perhalogenated $C_1$-$C_{20}$-alkyl- or $C_6$-$C_{40}$-aryl group,
$R^4$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl or an $OSiR_3^5$ group, where
$R^5$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl,
y is at least 1 and
x is an integer from 0 to 41,
C) at least one organometallic compound and
D) at least one organic transition metal compound
into contact with one another, thereby forming a reaction product; drying the reaction product to form the catalyst solid; and then bringing the catalyst solid into contact with E) at least one organoaluminum compound of the formula (I)

$$AlR^1R^2R^3 \quad (I)$$

where

R$^1$ is C$_1$-C$_{10}$-alkyl, C$_6$-C$_{15}$-aryl, halo-C$_1$-C$_{10}$-alkyl, halo-C$_6$-C$_{15}$-aryl, C$_7$-C$_{40}$-arylalkyl, C$_7$-C$_{40}$-alkylaryl, C$_1$-C$_{10}$-alkoxy or halo-C$_7$-C$_{40}$-alkylaryl, halo-C$_7$-C$_{40}$-arylalkyl or halo-C$_1$-C$_{10}$-alkoxy and R$^2$ and R$^3$ are identical or different and are each, independently of one another, hydrogen, halogen, C$_1$-C$_{10}$-alkyl, C$_6$-C$_{15}$-aryl, halo-C$_1$-C$_{10}$-alkyl, halo-C$_6$-C$_{15}$-aryl, C$_7$-C$_{40}$-arylalkyl, C$_7$-C$_{40}$-alkylaryl, C$_1$-C$_{10}$-alkoxy or halo-C$_7$-C$_{40}$-alkylaryl, halo-C$_7$-C$_{40}$-arylalkyl or halo-C$_1$-C$_{10}$-alkoxy, in a second step before polymerization, wherein the first and second steps are at from −10° C. to 80° C. for a period of from 0.5 minutes to 10 hours.

2. The process for preparing a catalyst composition for olefin polymerization as claimed in claim 1, which further comprises F) at least one Lewis base is used in addition to the components A), B), C) and D) for preparing the catalyst solid which is brought into contact with the organoaluminum compound E).

3. The process for preparing a catalyst composition for olefin polymerization as claimed in claim 1, wherein, in the formula (I) of the organoaluminum compound E), R$^1$ is C$_3$-C$_{10}$-alkyl and R$^2$ and R$^3$ are each hydrogen or C$_3$-C$_{10}$-alkyl.

4. The process for preparing a catalyst composition for olefin polymerization as claimed in claim 2, wherein, in the formula (I) of the organoaluminum compound E), R$^1$ is C$_3$-C$_{10}$-alkyl and R$^2$ and R$^3$ are each hydrogen or C$_3$-C$_{10}$-alkyl.

5. A catalyst system for the polymerization of olefins, comprising a catalyst composition prepared as claimed in claim 1.

6. A catalyst system for the polymerization of olefins, comprising a catalyst composition prepared as claimed in claim 4.

7. A catalyst system for the polymerization of olefins as claimed in claim 5 which further comprises G) at least one further organometallic compound as scavenger with which the monomers are brought into contact before they come into contact with the catalyst composition.

8. The catalyst system for the polymerization of olefins as claimed in claim 6 which further comprises G) at least one further organometallic compound as scavenger with which the monomers are brought into contact before they come into contact with the catalyst composition.

9. A process for the polymerization of olefins which comprises using the catalyst composition prepared from the process as claimed in claim 1.

10. A process for the polymerization of olefins which comprises using the catalyst composition prepared from the process as claimed in claim 4.

11. A process for the polymerization of olefins which comprises using the catalyst system as claimed in claim 5.

12. A process for the polymerization of olefins which comprises using the catalyst system as claimed in claim 8.

* * * * *